United States Patent Office 3,450,262
Patented June 17, 1969

3,450,262
METHOD OF FILTERING
Gene Hirs, 6865 Meadowlake, Birmingham, Mich. 48010
Filed Dec. 20, 1966, Ser. No. 603,191
Int. Cl. B01d 27/12
U.S. Cl. 210—80
9 Claims

ABSTRACT OF THE DISCLOSURE

A process of filtering liquid containing fine particles comprising passing the liquid through a filter medium. Flushing the medium with a second liquid having greater affinity for the particles than the first liquid. Purifying the second liquid for reuse in a subsequent flushing step.

---

Figure 1:
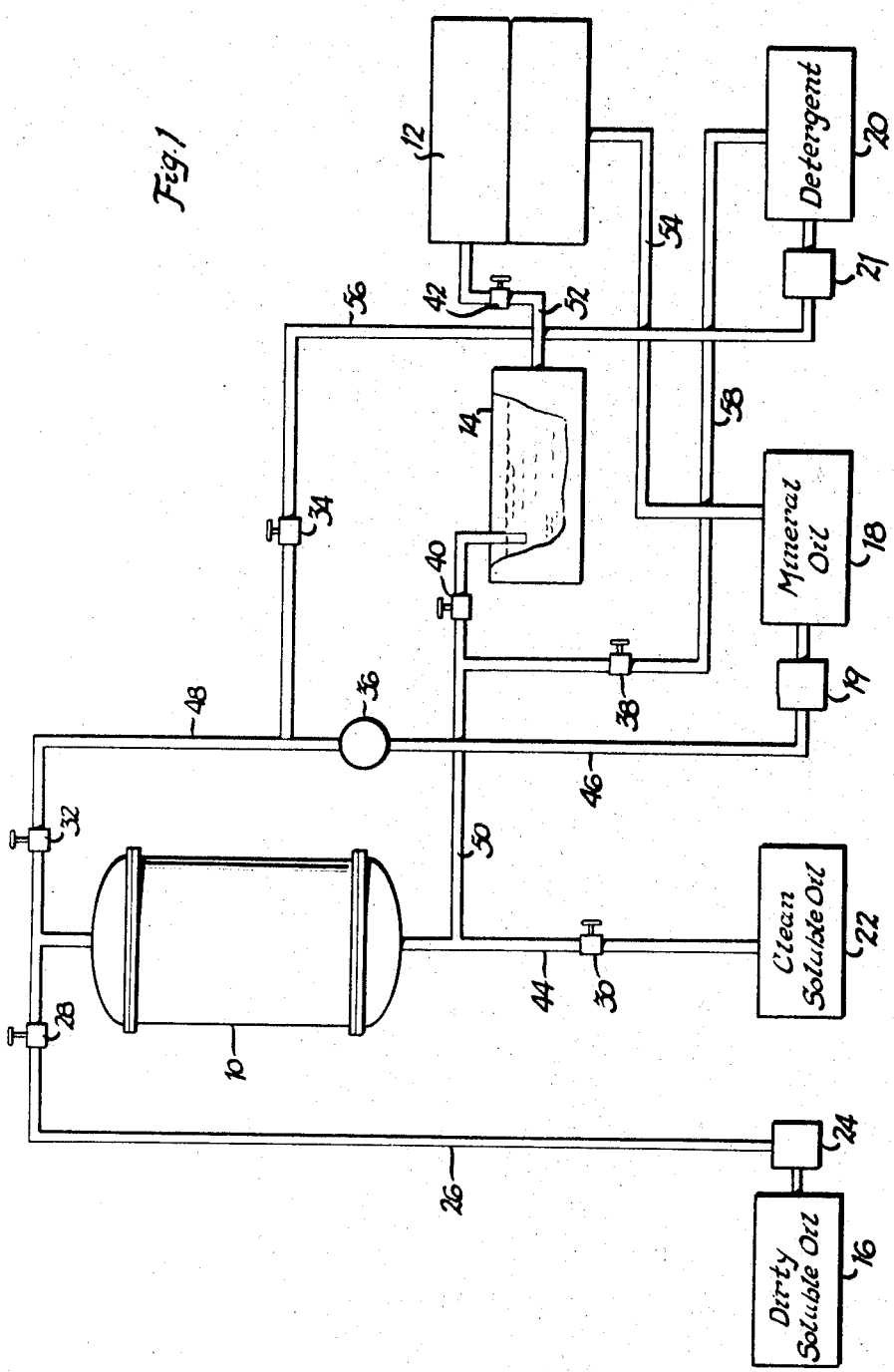

This invention relates generally to methods of filtering, and more particularly to a filtration method in which particles are removed from a first liquid in a primary filter, the primary filter medium is flushed with a second liquid to remove the particles from it, and the second liquid is filtered and stored for re-use as the flushing liquid.

In the filtration of certain finely divided contaminates, such as the scale present in the coolant of an aluminum hot-rolling process, such scale including particles ranging in size from one-half to ten microns, it has been necessary to utilize pre-coat filters. The use of such pre-coat filters prevents the utilization of "soluble oils", actually a dispersion of from about 4 to 15% oil in water, despite the advantages of lower volatility, non-flammability and non-toxicity of such oils when compared with mineral oils. The impracticality of soluble oils in such applications results from the fact that oil globules are of critical size, on the order of eight to ten microns, for effective removal of the contaminates, and the passage of the soluble oils through a pre-coat filter causes the oils to coalesce and become ineffective.

The present invention presents a new and novel filtration process which makes possible the use of soluble oils. Generally, the present invention utilizes a deep bed filter of the type disclosed and claimed in my co-pending patent application 552,736 filed in the U.S. Patent Office on May 25, 1966. It has been found that such a filter is effective to remove the extremely fine contaminate particles from soluble oils without causing coalescence of the oil globules. However, in order to be practical such a deep bed filter must be periodically cleaned or flushed to remove the previously filtered particulate matter therefrom, and such flushing with soluble oil is not effective. It has been found that flushing with mineral oil is effective to remove the finely divided particulate matter from the primary filter, and the present invention provides a process whereby the mineral oil is recovered for subsequent re-utilization as the flushing or cleaning medium.

Thus, it now becomes possible to utilize a soluble oil as a coolant or processing medium, e.g. in a hot mill rolling process for aluminum, without adversely effecting the soluble oil. The many advantages in reducing the hazards of fire, the health hazards to workers, the obvious reductions in capital investment and operating costs, etc. will be immediately evident to those skilled in the art.

Accordingly, it is an object of the present invention to provide a process for removing fine particles from a liquid by filtering with a particulate filter medium and for renewing the filter medium by flushing it with a different liquid.

Another object of the invention is to provide a filtering process wherein a contaminated soluble oil is filtered through a particulate filter medium to remove particles from the soluble oil without affecting the globule size of the soluble oil and the filter medium is renewed by flushing it with a mineral oil which has an affinity for the contaminant particles and which can be readily filtered in a pre-coat filter so that the mineral oil is recovered for subsequent re-use.

It is a further object of this invention to provide a method of and apparatus for the processing of a contaminated soluble oil coolant containing oil globules of specific size and finely divided contaminant particles, and wherein the particles are filtered from the soluble oil by the use of a particulate filter medium which does not coalesce the oil globules, and the particles are flushed from the medium by utilizing a mineral oil.

Other objects of this invention will appear in the following description and appended claims, reference being had to the accompanying drawings forming a part of this specification wherein like reference characters designate corresponding parts in the several views.

ON THE DRAWINGS

Figure 2:
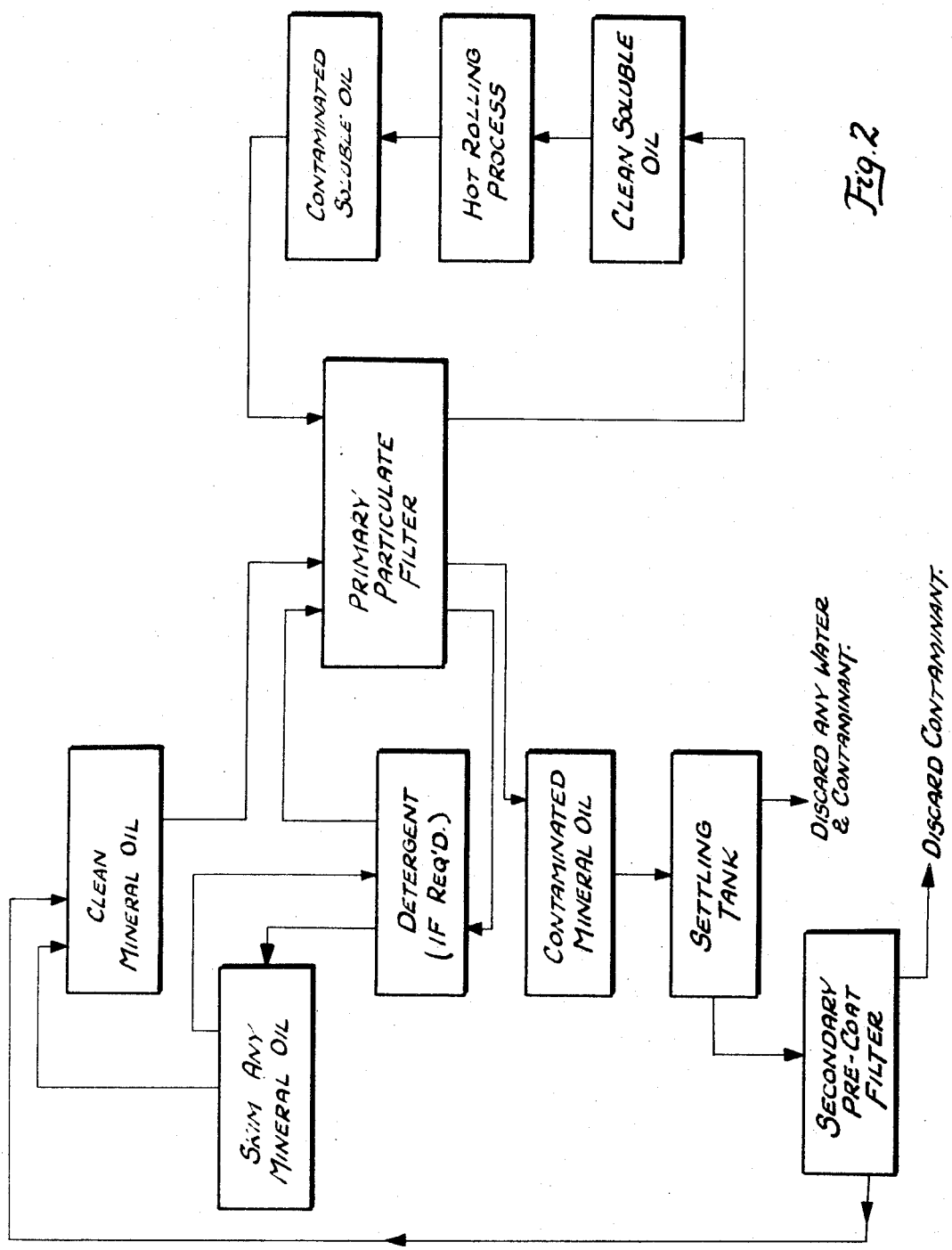

FIGURE 1 is a schematic diagram of a filtering apparatus by which the method of the invention is practiced; and FIGURE 2 is a flow chart illustrating the steps of the method.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The numeral 10 refers to a cartridge filter having a reusable filter medium comprised of very fine particles of coke, coal or sand. The average size of the particles of the filter medium may range from 35 to 70 U.S. sieve number, and these particles are smaller than normally provided in a particulate filter medium. The small particle size makes the filter have large surface area, and consequently, the filter medium need not be very deep; from 6 inches to 1 foot is deep enough. A filter of the cartridge type which is suitable for use in the method of this invention is described and claimed in the aforementioned Hirs application, Ser. No. 552,736, and reference may be made to that application for further information on the cartridge filter.

Another filter 12 is used in the method of the invention, and this filter is preferably of the flat bed type described in U.S. Patent No. 2,867,326 to Gene Hirs. The flat bed filter is provided with a disposable filter medium which is intermittently replaced by fresh filter medium by advancing a chain conveyor on which the filter medium is supported. The filter medium is preferably pre-coated with a filter aid, such as Fuller's earth, diatomaceous earth or a mixture thereof, for the filtering method of the present invention.

In addition to the two filters 12 and 14, a settling tank 14 may also be used for settling contaminants from mineral oil as will be described more fully hereinafter.

The liquids which are circulated through the system of FIGURE 1 are dirty "soluble oil" provided in a tank 16, mineral oil provided in a tank 18, and detergent provided in a tank 20. Clean "soluble oil" which is delivered from the cartridge filter 10 is stored in another tank 22. It will be understood that the method of the invention can be carried out with liquids other than those just referred to, but these liquids are particularly suited to the method. The term "soluble oil" refers to an aqueous dispersion of an oil such as an oil sold under the trademark "PROSOL" by Socony Mobil Company. Such an oil must have a globule size of from eight to ten microns to effectively remove aluminum particles ranging in size from one-half to ten microns and averaging from one to two microns. A suitable mineral oil is kerosene. It is particularly important for the flushing liquid to have greater affinity for the contaminant particles than the liquid being filtered in filter 10, and mineral oil such as kerosene satisfies this criteria with respect to aluminum particles.

The steps of the method are set forth in the flow diagram of FIGURE 2, and both FIGURES 1 and 2 will be referred to in describing the method steps. First, dirty soluble oil is pumped by a pump 24 through line 26 and open valve 28 into the cartridge filter 10. At this time valve 30 is open, and valves 32, 34, 36, 38, 40 and 42 are closed. The clean soluble oil flows from filter 10 through line 44 and open valve 30 into the clean oil tank 22. The contaminant particles in the dirty oil from tank 16 are filtered out by the particulate filter medium of filter 10. For example, the filter 10 will take out aluminum hot roll fines having an average size of one to two microns and an overall size range of one-half to ten microns.

When the filter medium of cartridge filter 10 becomes clogged, the circulation of soluble oil is stopped. Valves 28 and 30 are closed, and valves 32, 36, 40 and 42 are opened to prepare for circulation of mineral oil from tank 18. As shown in FIGURE 2, the second step of the method is to flush the cartridge filter with mineral oil, which may be kerosene. The mineral oil is pumped by pump 19 from tank 18 through lines 46 and 48 and open valves 36 and 32 into the filter 10, and the mineral oil flowing through the filter medium takes the contaminant particles out of the filter medium and leaves the filter through line 50. The dirty mineral oil flows through line 50 and open valve 40 into a settling tank 14 where some of the contaminant particles and any water are allowed to settle out as noted in FIGURE 2. The remaining liquid flows from settling tank 14 through line 52 and open valve 42 into the flat bed filter 12. The liquid may be pumped through the latter line or may flow by gravity into the upper shell 12a of the filter 12.

Next the mineral oil passes through a disposable filter medium provided in the flat bed filter. The disposable filter medium is preferably precoated with Fuller's earth or other filter aid, and the fines are removed from the mineral oil.

The clean mineral oil from filter 12 flows through line 54 to the tank 18 from which it may be recycled through the flushing system. Thus, the mineral oil flushes out the cartridge filter 10, is purified in settling tank 14 and filter 12, and is returned to tank 18 for storage and re-use in flushing of the cartridge filter.

After filter 10 has been flushed, it may sometimes be desirable to clean out any residual mineral oil before again passing soluble oil through this filter. For this purpose, a detergent liquid or a mixture of detergent and water from tank 20 may be passed through filter 10. Valves 36, 40 and 42 are closed, and valves 38 and 34 are opened. Valve 32 remains open. Detergent liquid is pumped by pump 21 through lines 48 and 56 and open valves 32 and 34 to the cartridge filter 10, and the detergent returns from the filter through lines 50 and 58 and open valve 38. Any mineral oil removed from the filter cartridge 10 may be skimmed from the surface of the tank 20. After the cartridge filter 10 has been cleaned, valves 32, 34 and 38 are closed. Valves 28 and 30 may then be opened again to prepare for circulation of soluble oil through filter 10 again to institute a new cycle of operation.

It is evident from the foregoing description that the invention provides a method of filtering contaminated liquid with a deep bed cartridge filter, and of flushing the particulate filter medium of that filter so as to remove contaminant particles. The flushing liquid has greater affinity for the particles than the original liquid, and so effectively removes contaminant particles from the filter medium. The flushing liquid is purified and returned for recycling through the flushing step, and this helps to make the process economical. The purification can be accomplished by passing the flushing liquid through a disposable filter medium in a flat bed filter, and the flushing liquid may first be subjected to settling if desired. The cartridge filter may also be cleaned with a detergent liquid before resuming flow of soluble oil through it.

By flushing the cartridge filter 10 with mineral oil, the use of the filter 10 is made possible. By using the cartridge filter 10, coalescence of the soluble oil is avoided, and the use of mineral oil as the primary coolant is avoided. Of course, a small amount of mineral oil is still utilized, but only within the closed flushing circuit. Thus, all of the advantages of soluble oil are obtained while still retaining the critical globule size.

I claim:
1. A method of filtering comprising the steps of passing a first liquid containing fine contaminant particles through a filter including a filter medium composed of extremely fine particles, thereby removing the contaminant particles from the first liquid, flushing said filter medium with a second liquid having greater affinity for the contaminant particles than said first liquid so as to remove said contaminant particles from said filter medium as a dispersion in said second liquid, and passing said dispersion through a disposable filter medium to remove contaminant particles therefrom.

2. The method of claim 1 in which the second liquid is recycled after filtration by re-using the same in said flushing step.

3. The method of claim 2 in which said first filter medium is cleaned, after said flushing thereof utilizing said second liquid, by passing a detergent through the same.

4. The method of claim 1 in which said first liquid is an aqueous dispersion of a soluble oil and said second liquid is a mineral oil.

5. The method of claim 4 in which said filter is a cartridge-type filter.

6. In a method of filtering wherein fine aluminum particles are removed from a coolant comprising an aqueous dispersion of soluble oil, the steps of (1) normally passing the coolant containing the fine particles through a first filter medium composed of extremely fine particles; (2) when said medium becomes clogged with aluminum particles, (a) terminating step (1) above, (b) flushing said filter medium with a mineral oil which has a greater affinity for the aluminum particles than does the coolant, thereby removing said aluminum particles from said filter medium with said mineral oil, and (c) flowing the aluminum particles and mineral oil into a settling tank; (3) re-instituting step (1) above; (4) passing the mineral oil and aluminum particles through a pre-coat filter to remove the aluminum particles therefrom, and (5) retaining the filtered mineral oil for re-use during a subsequent performance of step (2) above.

7. A method of filtering comprising the steps of passing a first liquid containing fine contaminant particles through a first filter medium to remove the contaminant particles from the first liquid, flushing said filter medium with a second liquid having greater affinity for said contaminant particles than said first liquid to remove said contaminant particles from said filter medium, purifying said second liquid, and recycling the purified second liquid through a subsequent flushing step.

8. The method of claim 7 in which said first liquid is an aqueous dispersion of a soluble oil and said second liquid is mineral oil.

9. A method of filtering comprising the steps of passing an aqueous dispersion of a soluble oil containing fine contaminant particles through a deep bed filter and through a filter medium thereof composed of extremely fine particles of material selected from the group consisting of coke, mill scale and sand, thereby removing the contaminant particles from said soluble oil, flushing said filter medium of said deep bed filter with a mineral oil which has greater affinity for said contaminant particles than said soluble oil dispersion to remove said contaminant particles from said filter medium, subjecting the mineral oil containing contaminant particles to settling, skimming from the settled bath the partially purified mineral oil, passing the mineral oil through a further pre-coat filter to remove contaminant particles therefrom, passing a detergent cleaning liquid through said filter medium of said deep bed filter to clean mineral oil therefrom, and recycling the purified mineral oil through a subsequent flushing step.

References Cited

UNITED STATES PATENTS

| | | | |
|---|---|---|---|
| 1,769,475 | 7/1930 | Teitsworth | 210—80 |
| 2,477,318 | 7/1949 | Stevenson | 210—81 X |
| 3,316,171 | 4/1967 | Mastrorilli | 210—34 |

SAMIN N. ZAHARNA, *Primary Examiner.*

U.S. Cl. X.R.

210—81, 269